No. 875,536. PATENTED DEC. 31, 1907.
J. LEDWINKA.
ELECTRIC CONTROLLER.
APPLICATION FILED AUG. 3, 1907.
3 SHEETS—SHEET 1.
FIG. I.
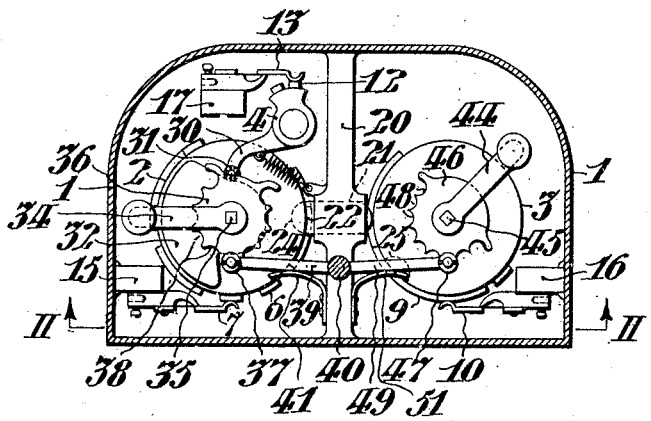
FIG. II.
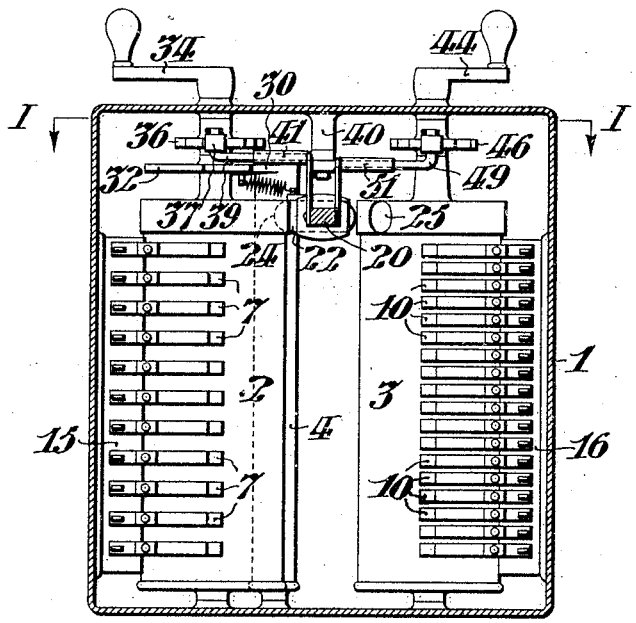
WITNESSES:
Clifton C. Hallowell
Thomas H. Kerr
INVENTOR:
JOSEPH LEDWINKA,
by Arthur E. Paige
Atty.

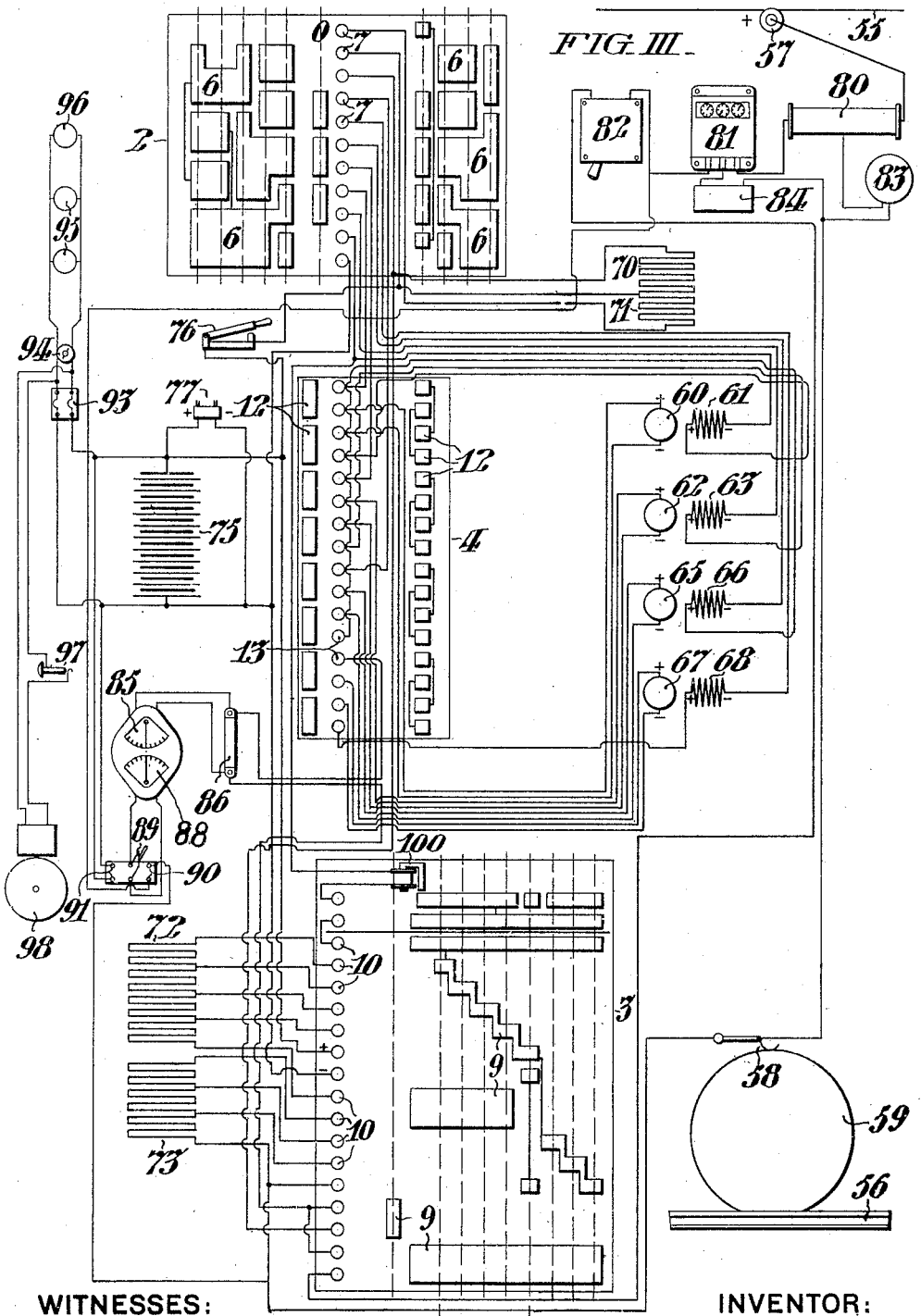

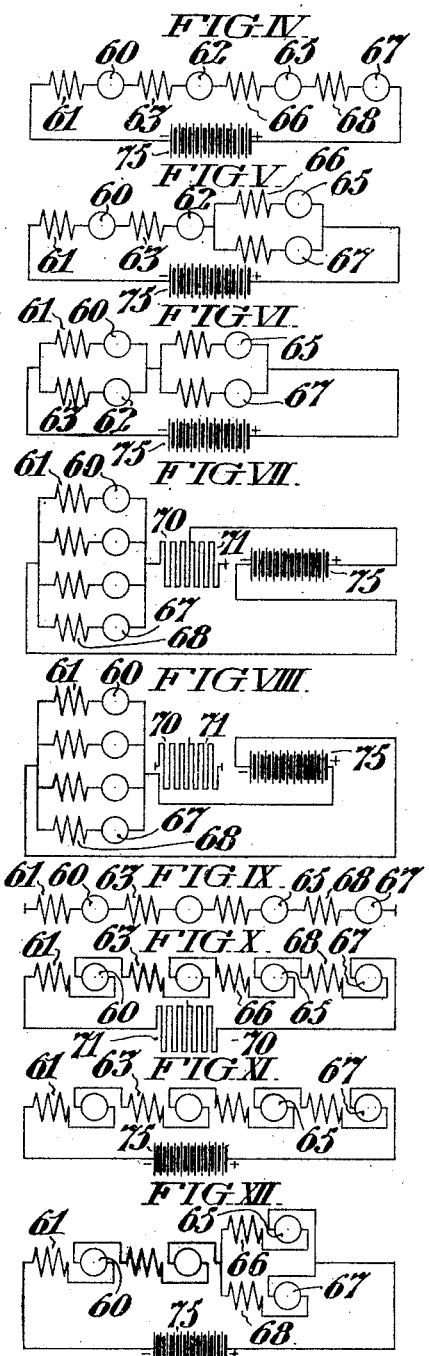
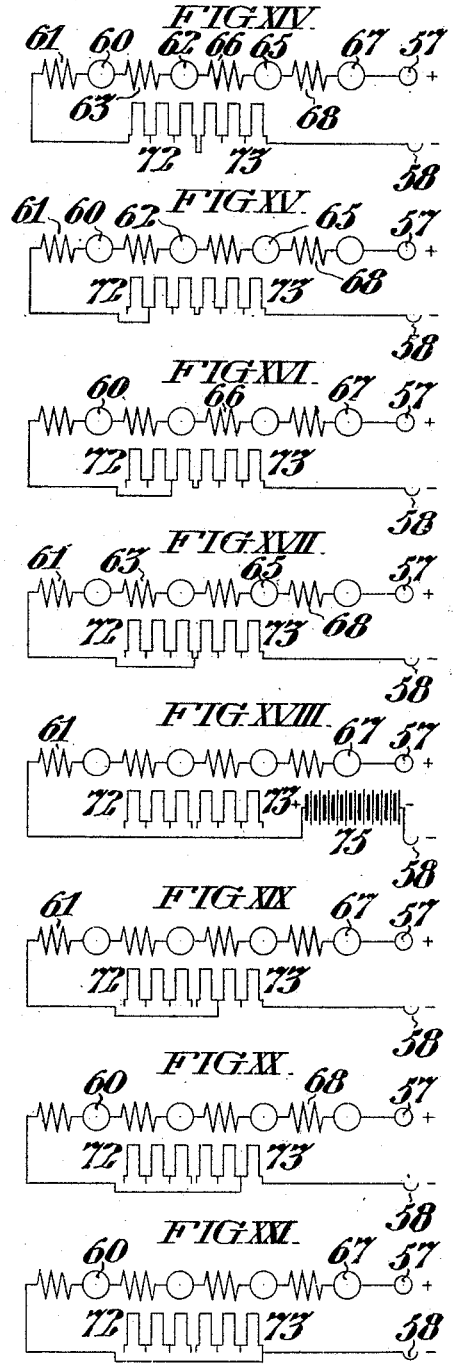
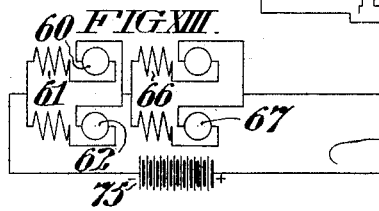

UNITED STATES PATENT OFFICE.

JOSEPH LEDWINKA, OF PHILADELPHIA, PENNSYLVANIA, ASSIGNOR TO RUSSELL THAYER, OF PHILADELPHIA, PENNSYLVANIA.

ELECTRIC CONTROLLER.

No. 875,536.  Specification of Letters Patent.  Patented Dec. 31, 1907.

Application filed August 3, 1907. Serial No. 386,861.

*To all whom it may concern:*

Be it known that I, JOSEPH LEDWINKA, of Philadelphia, in the State of Pennsylvania, have invented a certain new and useful Improvement in Electric Controllers, whereof the following is a specification, reference being had to the accompanying drawings.

My improvement is particularly designed for use in connection with vehicles of the type described in Letters Patent of the United States Reissue No. 12,449 dated February 6th, 1906, No. 838,283 dated December 11th, 1906 and No. 840,865 dated January 8th, 1907. Such a vehicle is provided with electric motors and a storage battery and is arranged to traverse the tracks of a railway supply system with said motors in connection with said system and to traverse a trackless road-bed independently of said system with said motors in operative connection with said battery.

My improvement provides means to permit the contemporaneously charging of the storage battery and operation of the vehicle motors by connection with a railway supply system when the current on said system is of such voltage as not to be directly applicable to charge said storage battery.

In the form of my invention hereinafter described, a resistance is included in connection with the motors while the latter are operating in connection with the railway supply system, except when it is desired to charge the battery, the latter is substituted for the resistance, by shifting the controller to a certain position, which is arranged to be the normal operating position of the controller while in connection with said system, so as to utilize the surplus electrical energy in charging the battery instead of wasting it in the resistance coils.

As hereinafter described, a mechanism conveniently embodying my improvement comprises three rotary drums carrying contact terminals in operative relation with stationary contact fingers. One of said drums is manipulated to control the circuits in the vehicle while in connection with the railway supply system. Another of said drums is manipulated to control the circuits in the vehicle while the motors are in operative relation with the battery, and, the third drum is arranged to coöperate with the second drum to reverse the direction of the current through the motors. Moreover, means are provided to interlock said first and second drums so that one cannot be manipulated until the other is returned to its zero position.

My invention comprises the various novel features of construction and arrangement hereinafter described.

In the drawings; Figure I, is a plan sectional view of a controller embodying my improvement, taken on the line I, I, in Fig. II. Fig. II, is a vertical sectional view of said controller, taken on the line II, II, in Fig. I. Fig. III, is a diagram showing the wiring connections for a vehicle of the type above described, provided with a controller embodying my improvement. Figs. IV to XIII inclusive are wiring diagrams showing the electrical connections corresponding with the ten positions of the controller drum, shown at the left hand side of Figs. I and II, as follows:—Fig. IV, shows the four motors of the vehicle, which are respectively local to its supporting wheels, connected in series relation with the storage battery. Fig. V, shows said four motors in two groups of two, respectively connected in series and parallel relation with the battery. Fig. VI, shows said four motors in two groups of two, connected in parallel series relation with each other and the battery. Fig. VII shows said four motors connected in parallel relation with the battery and in series relation with a resistance. Fig. VIII, shows said four motors connected in parallel relation with the battery. Fig. IX, which corresponds with the zero position of said controller drum, shows the four motors connected in series relation, and disconnected from the battery. Fig. X, which corresponds with the brake position of said controller drum, shows the four motors each reversely connected in series relation with the resistance coil, and disconnected from the battery. Fig. XI, shows said motors each reversely connected in series relation with the battery. Fig. XII, shows said motors reversely connected with the battery, in groups of two respectively in series and parallel relation with the battery. Fig. XIII, shows said motors each reversely connected with the battery in groups of two, each in parallel series relation with the battery. Figs. XIV to XXI, inclusive are wiring diagrams showing the electrical connections corresponding with the eight positions, exclusive of the zero position, of the controller drum shown at the right hand side of Figs. I, and II, as follows:—Fig. XIV, shows the four motors of the vehicle connected in series relation with the entire resistance coil. Figs. XV, XVI, and XVII, shows said four motors connected in series relation with the resistance coil, but including successively less of the latter. Fig. XVIII, which corresponds with the battery charging position of said controller drum and, as described, is the normal operating position of the controller, while in connection with the railway supply system shows said four motors connected in series relation with the battery and excluding the resistance coil. Figs. XIX, XX, and XXI, show said four motors connected in series relation with the resistance coil, but including successively less of the latter.

Referring to Figs. I, and II; 1, is the casing of the controller which incloses three rotary contact drums, 2, 3, and 4. Said drum 2, is brought into operation when it is desired to control the vehicle motors in connection with the storage battery, as shown in Figs. IV, to XIII, inclusive, and, the drum 3, is utilized when it is desired to control the vehicle motors in connection with the external supply system, as shown in Figs. XIV to XXI, inclusive. Said drum 4, is arranged to coöperate with the drum 2, to automatically reverse the direction of the current through the motors in accordance with the position of said drum 2. Said drum 2, carries the contact terminals 6, in operative relation with the stationary contact fingers 7. Said drum 3, carries the contacts 9, in operative relation with the stationary contact fingers 10, and, said drum 4, carries the contacts 12, in operative relation with the stationary contact fingers 13. Said contact fingers 7, 10, and 13, are respectively supported in stationary relation with the casing 1, by the vertical bars 15, 16, and 17.

The horizontal bar 20, which extends between the drums 2, and 3, as shown in Fig. I, comprises the socket 21, for the reciprocatory locking plunger 22, which is arranged to alternately engage the recess 24, in the drum 2, and the recess 25, in the drum 3; the arrangement being such that neither of said drums 2, and 3, can be manipulated while the other is turned from its zero position. For instance, as shown in Fig. I, said locking plunger 22, is in engagement with the recess 24, of the drum 2, and is maintained in locked relation therewith by the periphery of the drum 3, which is turned from its zero position, and, consequently said drum 2, can not be turned until the drum 3, is returned to the zero position in which the recess 25, registers with said locking plunger 22.

As shown in Fig. I; the drum 4, is provided with the lever arm 30, and roller 31, in operative relation with the cam 32, which is carried by the drum 2; so that said drum 4, is arranged to be turned in accordance with the manual movement of said drum 2, to coöperate with the latter to reverse the direction of the current through the motors. Said drum 2, is provided with the operating lever handle 34, engaged with the drum shaft 35, and, the disk 36, is mounted on said shaft 35, in rigid relation with the drum 2, so as to coöperate with the detent roller 37, to detain said drum in any selected one of the ten positions respectively corresponding with the ten arrangements of the circuits illustrated in Figs. IV, to XIII inclusive. As shown, said detent roller 37, which engages the notches 38, in said disk 36, is carried by the detent lever 39, which is fulcrumed upon the stud 40, depending from the casing 1, as shown in Fig. II, and, said lever 39, is provided with the spring 41, normally presenting said roller 37, in operative relation with said disk notches 38.

The drum 3, is provided with the operating lever handle 44, rigidly connected with the drum shaft 45, and, the disk 46, is mounted on said shaft 45, in rigid relation with the drum 3, so as to coöperate with the detent roller 47, to detain said drum in any selected one of the positions corresponding with the eight arrangements of the circuits illustrated in Figs. XIV, to XXI, inclusive. As shown, said detent roller 47, which engages the notches 48, in said disk 46, is carried by the detent lever 49, which is fulcrumed upon the stud 40, depending from the casing 1, as shown in Fig. II, and, said lever 49, is provided with the spring 51, normally presenting said roller 47, in operative relation with said disk notches 48.

Referring to Fig. III; the overhead supply wire 55, and the subjacent tracks 56, are included in a railway supply system with which the vehicle may be operatively connected as herein contemplated; said conductor 55, being the positive and said conductor 56, being the negative side of said circuit. The trolley 57, may be supported on the vehicle in any convenient manner in removable relation with said conductor 55, and, the contact brush 58, bears upon the metallic rim or tire of the vehicle wheel 59, and makes electrical connection with said subjacent track 56. All of the other devices illustrated in Fig. III, are carried by the vehicle, as follows:—The electrical contact terminals 6, 9, and 12, carried by the respective drums 2, 3, and 4, above described and the stationary contact fingers 7, 10 and 13, which coöperate therewith, are shown in plane development in said Fig. III, wherein the respective drums are indicated by the respective rectangular figures marked 2, 3, and 4. As shown in Fig. III, the drum 2, carries the contact terminals 6, in operative relation with the contact fingers 7, of which there are eleven; the drum 3, carries the contact terminals 9, which coöperate with the eighteen stationary contact fingers 10, and, the drum 4, carries the contact terminals 12, which coöperate with the sixteen stationary contact fingers 13.

Fig. III, diagrammatically illustrates the connections for four motors arranged to propel the vehicle and respectively local to the four supporting wheels thereof; 60 and 61, respectively indicating the armature and field coils of the right rear motor; 62, and 63, respectively indicating the armature and field coils of the left rear motor; 65 and 66, respectively indicating the armature and field coils of the right front motor, and, 67 and 68 respectively indicating the armature and field coils of the left front motor. All of the variable resistance coils to be included in connection with the motors may be conveniently located in one place in the vehicle, but, for convenience of illustration I have shown said coils disposed in four groups in Fig. III; wherein 70, indicates the group used in connection with the motors while the latter are in operative relation with the battery; 71 indicates the group brought into circuit with the group 70, as shown in Fig. X, when the brakes are applied; and, 72 and 73, indicate groups which are utilized when the motors are in circuit with the exterior supply system; said group 72, being connected as in Figs. XIV to XVII, inclusive and the group 73, being utilized when the motors are connected as in Figs. XIX, to XXI inclusive.

In Fig. III; 75 indicates the storage battery, comprising say, forty cells which are included in connection with the motors as shown in Figs. IV, to VIII inclusive and XI, to XIII inclusive. The switch 76, and charging plug 77, shown included in circuit with said battery 75, are only employed in case of emergency, when it is desired to charge the battery by connecting it otherwise than through the controller as shown in Fig. XVIII. The other devices which are comprised in the electrical equipment of the car, as indicated in Fig. III, are connected as follows:—The choke coil 80, wattmeter 81, and over-load cut out switch 82, are directly connected in series with the lead from the trolley 57. The lightning arrester 83, and wattmeter resistance 84, are connected in a shunt leading to the contact 58. The ammeter 85, and ammeter shunt 86, are connected in parallel between a contact finger 10, of the drum 3, and a contact finger 13, of the drum 4, and, the volt meter 88, is in circuit with the central terminals of the double pole switch 89, which is arranged to alternately connect with the terminals 90, or 91 respectively, when the vehicle is in operative relation with the exterior supply system and with the battery 75. The five ampere fuse block 93, leads to the snap switch 94, which controls three lamps disposed in parallel relation and designed to operate at eighty volts at 9. C. P.; the two lamps 95, being used as head lights in the vehicle and the single lamp 96, being used as the rear danger signal. Said fuse block 93, also leads to the floor push switch 97, which controls the signal bell 98, which is designed to operate at eighty volts. The magnetic blow out device 100, is local to the upper contact 9, on the drum 3, and in circuit with a finger 10, adapted to coöperate with said contact.

The ten vertical dash lines on the plane development of the drum 2, in Fig. III, respectively indicate the ten different positions which said drum is capable of assuming with respect to the contact fingers 7, determining the connections of the circuits as shown respectively in Figs. IV to XIII, inclusive. The dash line 0 indicates the zero position, corresponding with Fig. IX, in which the four motors 60, 62, 65, and 67, are disconnected from the battery so that they may be connected with the external supply system by the drum 3, and as shown in Figs. XIV, to XXI inclusive. The series of five dash lines extending to the left of said line 0, successively indicate the positions of the drum corresponding with Figs. IV, to VIII inclusive. The first line to the right of said line 0, indicates the position of the drum corresponding with Fig. X, being the "brake" position wherein the direction of the circuit through the armatures of said motors is reversed and the circuit is closed through the resistance 71, to check the rotation of said armatures. The series of three dash lines extending to the right of said line indicating the "brake" position successively indicate the positions of said drum 3, corresponding with Figs. XI, to XIII inclusive The nine vertical dash lines on the plane development of the drum 3, in Fig. III, respectively indicate the nine different positions which said drum is capable of assuming with respect to the contact fingers 10. The left end line indicates the zero position of said drum 3, for which there is no corresponding diagram shown in the drawings. However, the next line (marked XIV in Fig. III) indicates the position of said drum 3, corresponding with Fig. XIV, and the other seven dash lines extending to the right of said line XIV, successively indicate the positions of the drum corresponding with Figs. XV, to XXI, inclusive, it being particularly noted that the line XVIII indicates the position corresponding with Fig. XVIII, wherein the resistance 72, 73 is excluded and the battery 75, reversely included with respect to the external supply circuit, so as to charge said battery contemporaneously with the operation of the four motors which are shown connected in series therewith.

It is obvious that various modifications may be made without departing from the essential features of my invention, as defined in the appended claims, and, therefore I do not desire to limit myself to the precise details of construction and arrangement herein set forth.

I claim:—

1. An electric controller comprising two relatively rotary contact drums and means arranged to interlock said drums so that one cannot be manipulated until the other is returned to its zero position; comprising a plunger mounted to reciprocate between said drums and alternately engage recesses in the respective drums; and, a drum arranged to coöperate with one of the other drums aforesaid to reverse the direction of the current through the motors as a consequence of the operation of the drum with which it is connected, substantially as set forth.

2. In a vehicle provided with electric motors and a storage battery, and arranged to be propelled by said motors in alternately operative connection with said battery and with an exterior railway supply system; a controller comprising three rotary contact drums, in operative relation with stationary contact fingers; means arranged to interlock two of said drums so that neither drum can be manipulated until the other is returned to its zero position; and, means arranged to operatively connect the third drum with one of said interlocked drums, substantially as set forth.

3. In a vehicle provided with electric motors and a storage battery, and arranged to be propelled by said motors in alternately operative connection with said battery, and with an exterior railway supply system; a controller comprising three rotary contact drums, in operative relation with stationary contact fingers; means arranged to interlock two of said drums, which are respectively connected to control the circuits between the motors and said supply system and battery, so that one drum cannot be manipulated until the other is returned to its zero position; and, means arranged to operatively connect the third drum with one of said interlocked drums, substantially as set forth.

4. In a vehicle provided with electric motors and a storage battery, and arranged to be propelled by said motors in alternately operative relation with said battery, and an external railway supply system; a controller comprising three rotatable drums carrying contact terminals in operative relation with stationary contact fingers, the first drum being connected to control the circuits in the vehicle while the motors are in operative relation with the railway supply system; the second drum being connected to control the circuits in the vehicle while the motors are in operative relation with the battery, and, the third drum being connected to coöperate with the second drum to reverse the direction of the current through the motors in accordance with the position of said second drum, substantially as set forth.

5. In a vehicle provided with electric motors, a variable resistance, and a storage battery, and arranged to be propelled by said motors in alternately operative relation with said battery, and an external railway supply system; a controller connected and arranged to include said resistance in connection with the motors except when it is desired to charge the battery, and, to substitute the battery for the resistance in the motor circuit when it is desired to charge the battery, substantially as set forth.

6. In a vehicle provided with electric-motors, a variable resistance, and a storage battery, and arranged to be propelled by said motors in alternately operative relation with said battery, and an external railway supply system; a controller connected and arranged to include said resistance in connection with the motors except when it is desired to charge the battery, and, to substitute the battery for the resistance in the motor circuit when it is desired to charge the battery; comprising three rotary contact drums, in operative relation with stationary contact fingers; means arranged to interlock two of said drums so that neither drum can be manipulated until the other is returned to its zero position; and, means arranged to operatively connect the third drum with one of said interlocked drums, substantially as set forth.

7. In a vehicle provided with electric motors, a variable resistance, and a storage battery, and arranged to be propelled by said motors in alternately operative relation with said battery, and an external railway supply system; a controller connected and arranged to include said resistance in connection with the motors except when it is desired to charge the battery, and, to substitute the battery for the resistance in the motor circuit when it is desired to charge the battery; comprising three rotary contact drums, in operative relation with stationary contact fingers; means arranged to interlock two of said drums which are respectively connected to control the circuits between the motors and said supply system and battery, so that one drum cannot be manipulated until the other is returned to its zero position; and, means arranged to operatively connect the third drum with one of said interlocked drums, substantially as set forth.

8. In a vehicle provided with electric motors, a variable resistance, and a storage battery, and arranged to be propelled by said motors in alternately operative relation with said battery, and an external railway supply system; a controller connected and arranged to include said resistance in connection with the motors except when it is desired to charge the battery, and, to substitute the battery for the resistance in the motor circuit when it is desired to charge the battery, comprising three rotatable drums carrying contact terminals in operative relation with stationary contact fingers, the first drum being connected to control the circuits in the vehicle while the motors are in operative relation with the railway supply system; the second drum being connected to control the circuits in the vehicle while the motors are in operative relation with the battery, and, the third drum being connected to coöperate with the second drum to reverse the direction of the current through the motors in accordance with the position of said second drum, substantially as set forth.

9. In a vehicle provided with electric motors, a variable resistance, and a storage battery, and arranged to be propelled by said motors in alternately operative relation with said battery, and an external railway supply system; a controller connected and arranged to include said resistance in connection with the motors except when it is desired to charge the battery, and, to substitute the battery for the resistance in the motor circuit when it is desired to charge the battery; comprising means arranged to connect said motors in series relation in circuit with the external railway supply system, and in parallel relation in circuit with said battery, substantially as set forth.

10. In a vehicle provided with electric motors, a variable resistance, and a storage battery, and arranged to be propelled by said motors in alternately operative relation with said battery, and an external railway supply system; a controller connected and arranged to include said resistance in connection with the motors except when it is desired to charge the battery, and, to substitute the battery for the resistance in the motor circuit when it is desired to charge the battery; comprising means arranged to connect said motors in series relation in circuit with the external railway supply system, and in parallel relation in circuit with said battery; and means connected and arranged to reverse the normal direction of the circuit through the armatures of said motors in connection with said resistance, to check the rotation of said armatures, substantially as set forth.

11. In a vehicle provided with electric motors, a variable resistance, and a storage battery, and arranged to be propelled by said motors in alternately operative relation with said battery, and an external railway supply system; a controller connected and arranged to include said resistance in connection with the motors except when it is desired to charge the battery, and, to substitute the battery for the resistance in the motor circuit when it is desired to charge the battery, and means connected and arranged to reverse the normal direction of the circuit through the armatures of said motors in connection with said resistance, to check the rotation of said armatures, substantially as set forth.

12. In a vehicle provided with electric motors, a variable resistance, and a storage battery, and arranged to be propelled by said motors in alternately operative relation with the battery, and an external railway supply system; a controller connected and arranged to include said resistance in series connection with the motors except when it is desired to charge the battery, and, to substitute the battery for the resistance in the motor circuit when it is desired to charge the battery, substantially as set forth.

13. In a vehicle provided with electric motors, a variable resistance, and a storage battery, and arranged to be propelled by said motors in alternately operative relation with the battery, and an external railway supply system; a controller connected and arranged to include said resistance in series connection with the motors except when it is desired to charge the battery, and, to substitute the battery for the resistance in the motor circuit when it is desired to charge the battery; comprising three rotary contact drums, in operative relation with stationary contact fingers; means arranged to interlock two of said drums so that neither drum can be manipulated until the other is returned to its zero position; and, means arranged to operatively connect the third drum with one of said interlocked drums, substantially as set forth.

14. In a vehicle provided with electric motors, a variable resistance, and a storage battery, and arranged to be propelled by said motors in alternately operative relation with said battery, and an external railway supply system; a controller connected and arranged to include said resistance in series connection with the motors except when it is desired to charge the battery, and, to substitute the battery for the resistance in the motor circuit when it is desired to charge the battery; comprising three rotary contact drums, in operative relation with stationary contact fingers; means arranged to interlock two of said drums which are respectively connected to control the circuits between the motors and said supply system and battery, so that one drum cannot be manipulated until the other is returned to its zero position; and, means arranged to operatively connect the third drum with one of said interlocked drums, substantially as set forth.

15. In a vehicle provided with electric motors, a variable resistance, and a storage battery, and arranged to be propelled by said motors in alternately operative relation with said battery, and an external railway supply system; a controller connected and arranged to include said resistance in series connection with the motors except when it is desired to charge the battery, and, to substitute the battery for the resistance in the motor circuit when it is desired to charge the battery, comprising three rotatable drums carrying contact terminals in operative relation with stationary contact fingers, the first drum being connected to control the circuits in the vehicle while the motors are in operative relation with the railway supply system; the second drum being connected to control the circuits in the vehicle while the motors are in operative relation with the battery, and, the third drum being connected to coöperate with the second drum to reverse the direction of the current through the motors in accordance with the position of said second drum, substantially as set forth.

16. In a vehicle provided with electric motors, a variable resistance, and a storage battery, and arranged to be propelled by said motors in alternately operative relation with said battery, and an external railway supply system; a controller connected and arranged to include said resistance in connection with the motors except when it is desired to charge the battery, and, to substitute the battery for the resistance in the motor circuit, in series relation with said motor, when it is desired to charge the battery; comprising means arranged to connect said motors in series relation in circuit with the external railway supply system, and in parallel relation in circuit with said battery, substantially as set forth.

In testimony whereof, I have hereunto signed my name, at Philadelphia, in the State of Pennsylvania, this 23rd day of July 1907.

JOSEPH LEDWINKA.

Witnesses:
ARTHUR E. PAIGE,
CLIFTON C. HALLOWELL.